United States Patent
Kawai et al.

(10) Patent No.: US 7,273,227 B2
(45) Date of Patent: Sep. 25, 2007

(54) CURTAIN-SHIELD AIRBAG CLIP AND ASSEMBLIES USING THE CLIP

(75) Inventors: Yasuhiro Kawai, Toyohashi (JP); Yasushi Kubota, Toyota (JP); Tatsuya Goto, Kariya (JP); Hirokazu Niimi, Kariya (JP)

(73) Assignees: Newfrey LLC, Newark, DE (US); Kabushiki Kaisha Toyota Jidoshokki, Kariya-shi (JP)

( * ) Notice: Subject to any disclaimer, the term of this patent is extended or adjusted under 35 U.S.C. 154(b) by 233 days.

(21) Appl. No.: 10/902,568

(22) Filed: Jul. 30, 2004

(65) Prior Publication Data

US 2005/0062263 A1    Mar. 24, 2005

(30) Foreign Application Priority Data

Jul. 31, 2003    (JP)    ............... 2003-204506

(51) Int. Cl.
   *B60R 21/16*    (2006.01)
(52) U.S. Cl. .................... 280/730.2; 411/508
(58) Field of Classification Search ............ 280/728.2, 280/730.2; 411/41, 45, 46, 47, 48, 508; 24/297, 24/457, 458
   See application file for complete search history.

(56) References Cited

U.S. PATENT DOCUMENTS

| 3,756,116 | A |   | 9/1973 | Schuplin |        |
|-----------|---|---|--------|----------|--------|
| 4,375,342 | A | * | 3/1983 | Wollar et al. | 411/41 |
| 4,403,377 | A | * | 9/1983 | Mizusawa | 24/681 |
| 4,757,664 | A | * | 7/1988 | Freissle | 52/509 |
| 4,906,152 | A | * | 3/1990 | Kurihara | 411/182 |
| 4,952,106 | A | * | 8/1990 | Kubogochi et al. | 411/48 |
| 6,514,024 | B2 |  | 2/2003 | Akema et al. |    |
| 6,533,487 | B2 | * | 3/2003 | Clark | 403/70 |
| 6,553,615 | B1 | * | 4/2003 | Hansen et al. | 16/2.1 |
| 6,726,417 | B2 | * | 4/2004 | Kanie | 411/48 |
| 2002/0067029 | A1 | * | 6/2002 | Guthke et al. | 280/730.2 |
| 2003/0129040 | A1 | * | 7/2003 | Arisaka | 411/41 |
| 2004/0136812 | A1 | * | 7/2004 | Kawai et al. | 411/508 |

FOREIGN PATENT DOCUMENTS

| EP | 1 104 724 | 6/2001 |
| EP | 1 264 743 | 12/2002 |
| EP | 1 422 112 | 5/2004 |
| JP | 59-141210 | 9/1984 |
| JP | 1-216109 | 8/1989 |
| JP | 2002-104127 | 4/2002 |

* cited by examiner

*Primary Examiner*—Paul N. Dickson
*Assistant Examiner*—Tiffany L. Webb
(74) *Attorney, Agent, or Firm*—Miles & Stockbridge P.C.

(57) ABSTRACT

A clip for attaching a curtain-shield airbag to a body panel of a vehicle comprises a bushing and a pin. The bushing has a flange with a leg extending therefrom. A bore extends through the flange and into the leg for receiving the pin. Outer surfaces of the leg have engagement pieces with shoulders for coupling the bushing to edge regions of a body panel hole into which the leg is inserted. The pin and the bushing are capable of being coupled in a provisionally fixed condition or a permanently fixed condition. When the pin is partially inserted into the bore, the engagement pieces are permitted to flex inwardly of the bore, but when the pin is fully inserted, such inward flexing is prevented. The flange has a wall that provides a partition between the main airbag unit and the entrance hole of the bore in the flange.

23 Claims, 7 Drawing Sheets

CURTAIN-SHIELD AIRBAG CLIP AND ASSEMBLIES USING THE CLIP

CROSS-REFERENCE TO RELATED APPLICATION

This application claims the benefit of Japanese Patent Application No. 2003-204506 filed Jul. 31, 2003, incorporated herein by reference.

BACKGROUND OF THE INVENTION

The present invention relates to a clip for attaching an airbag attaching member for a curtain-shield airbag to a body panel and to assemblies using the clip.

A device for attaching a head-protecting curtain-shield airbag to a body panel is disclosed in Laid-Open Patent Application [TOKKAI] No. 2002-104127, gazette publication (Patent Literature 1). This device comprises, a knob, a leg, and an engagement member. By inserting the engagement member and leg of the device into an attachment hole in an airbag attaching member and into an attachment hole in the body panel, and turning the knob, the curtain-shield airbag is attached to the body panel.

A screw grommet for coupling two panels is disclosed in Laid-Open Patent Application [TOKKAI] No. H1-216109/1989, gazette publication (Patent Literature 2). This screw grommet comprises a shaft with a flange at one end. A bore for receiving a tapping screw extends through the flange and the shaft. Tapered flexible claws project outwardly from the shaft. In use, the shaft is inserted through an attachment hole in one panel until one side of the flange abuts that panel; a second panel is abutted with the other side of the flange with an attachment hole aligned with the attachment hole of the first panel; and the screw is threaded into the bore of the grommet through the attachment holes in the panels. The flexible claws project outwardly from the shaft to hold the screw grommet in place.

A clip for attaching a part to a body panel is disclosed in Laid-Open Utility Model Application [JIKKAI] No. S59-141210/1984, gazette publication (Patent Literature 3) and comprises a bushing and a flanged pin that is inserted into the bushing to expand the bushing and hold it on the panel even if there are burrs in a panel attachment hole into which the bushing is inserted.

With the device for attaching a curtain-shield airbag to a body panel described in TOKKAI 2002-104127, gazette publication (Patent Literature 1), an attachment operation can be performed without the use of tools, but the strength of the attachment is not high. Since the airbag deploys very rapidly when activated, the reactive force on the device is large, and there is a danger of detachment.

With another curtain-shield airbag attachment device, a nut is welded to the body panel, and the airbag attaching member of the curtain-shield airbag is attached with a bolt. The strength of that attachment is great, but there is the necessity of welding the nut to the body panel, which militates against simplifying automobile assembly operations. Furthermore, in the attaching operation, the curtain-shield airbag must first be provisionally attached to the body panel, and then permanently attached with a bolt, requiring a special structure for the provisional attachment.

With the screw grommet of TOKKAI No. H1-216109/1989, gazette publication (Patent Literature 2), an operation is required for positioning the second panel and holding it so that the attachment hole thereof is aligned with the bore opening in the flange, and a tapping screw screwing operation is also required.

With the clip in JIKKAI No. S59-141210, gazette publication (Patent Literature 3), attachment is maintained even if there are burrs in the edge of the attachment hole, but both the bushing and the pin must be formed in a special shape so as to suppress the effects of burrs.

In Patent Literature 2, moreover, there is no suggestion of the screw grommet thereof being usable in attaching a curtain-shield airbag, nor in Patent Literature 3 is there any suggestion of the clip thereof being usable in attaching a curtain-shield airbag. More particularly, there is no teaching as to how to cope with the reaction force against the clip which accompanies the rapid deployment of the airbag when activated.

BRIEF DESCRIPTIONS OF THE INVENTION

An object of the present invention is to provide a curtain-shield airbag attachment clip that avoids or overcomes the deficiencies of the prior art, and to provide assemblies using the clip. More particularly, the invention provides high attachment strength, avoids the need for welding a nut to a body panel, provides for simple provisional attachment, avoids the need for installing a tapping screw, and has other advantages as well.

A clip in accordance with the invention comprises two components, namely, a pin and a bushing for receiving the pin. The bushing comprises a leg that is inserted into an attachment hole in an airbag attaching member and into an attachment hole in a body panel, and a flange integral with the leg for holding the airbag attaching member in cooperation with the body panel. The bushing has a bore extending from an opening in the flange and into the leg for receiving the pin therein. The leg is provided, exteriorly, with a resiliently mounted engagement piece for maintaining attachment of the bushing to an airbag attaching member and a body panel having holes through which the leg of the bushing is inserted. The pin can be inserted into the bore of the bushing to be held at a provisional position, at which the engagement piece is able to flex inwardly of the bore in the leg, and a final position at which the engagement piece is prevented from flexing inwardly of the bore. The flange has an integral partition plate which forms a partition between the main airbag unit of the curtain-shield airbag and part of the flange at which the bore opening is located.

BRIEF DESCRIPTION OF THE DRAWINGS

The invention will be further described in conjunction with the accompanying drawings, which show a preferred (best mode) embodiment, and wherein.

DETAILED DESCRIPTION OF THE INVENTION

Figure 1:
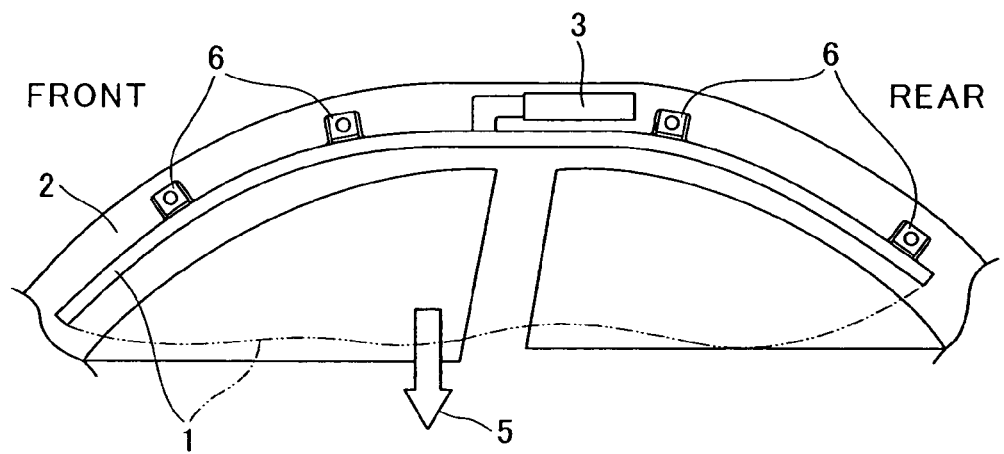
FIG. 1 is a diagram explaining how a curtain-shield airbag is attached to an automobile body panel.

A first embodiment of the present invention will now described with reference to the drawings. FIG. 1 basically diagrams how a curtain-shield airbag 1 is attached in an automobile. The curtain-shield airbag 1, which is primarily for protecting the heads of occupants of the automobile, is attached to a body panel 2 at the top of the door windows, from the front to the rear, on the inside of the automobile. At the time of a collision, for example, gas from a compressed gas source 3 (an inflator) is ejected, and the curtain-shield airbag very rapidly deploys toward the lower part of the door windows (in the direction of arrow 5) to protect the heads and other body portions of vehicle occupants. The curtain-shield airbag 1 comprises a main airbag unit and airbag attaching members 6. The airbag attaching members are secured to a body panel, such as a frame of the automobile, at a plurality of prescribed positions at the top of the door windows. The main airbag unit, at normal times, is folded small and housed at a fixed position at the top of the door windows.

Figure 2:
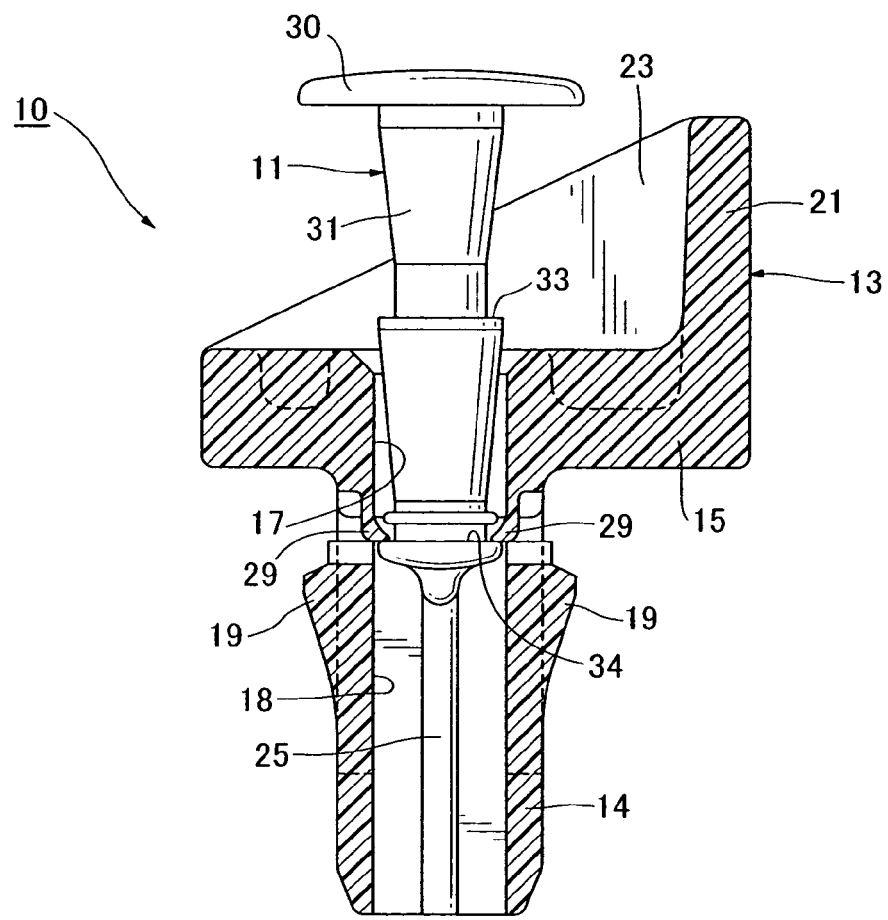
FIG. 2 is a sectional view of the bushing of a clip relating to an embodiment of the present invention.

FIG. 2 shows a clip 10 relating to the first embodiment of the present invention. This clip 10 comprises two components, namely a rod-shaped pin 11 and a bushing 13 for receiving the pin 11. The bushing 13 comprises a leg 14 that is inserted into an attachment hole in an airbag attaching member and into an attachment hole in a body panel, and a flange 15 formed integrally with the leg, for holding the airbag attaching member in cooperation with the body panel. In the flange 15 and the leg 14, a bore is formed comprising a flange hole 17 and a shaft hole 18 continuing therefrom, into which the pin 11 can be inserted. On outer side surfaces of the leg 14, one or more resiliently mounted engagement pieces 19 are provided, protruding to the outside, and capable of engaging edge regions of an attachment hole in the airbag attaching member 6 and an attachment hole in the body panel 2. The configuration is such that, when the pin 11 is substantially fully inserted into the bore 17, 18, the engagement pieces 19 are put in a permanently fixed condition, with the flexure thereof toward the inside of the shaft hole prevented. When the pin 11 is not deeply in the bore 17, 18, as shown in FIG. 2, the engagement pieces are put in a provisionally fixed condition which allows flexure toward the inside of the shaft hole 18. The pin 11 and the bushing are coupled so that they can not be easily separated when in the provisionally fixed condition, as shown in FIG. 2.

At one edge of the flange 15, a partition plate 21 stands perpendicularly from the flange edge, so as to provide a partition between the main airbag unit of the curtain-shield airbag 1 and the part of the flange 15 where the opening to the hole 17 is located.

Details of the bushing 13 will now be described with reference to FIGS. 2 to 7. The bushing 13 is preferably an integral molding formed of hard plastic, comprising the leg 14 for insertion into both an attachment hole in the airbag attaching member 6 of the curtain-shield airbag 1 from an attachment hole in the body panel 2, the flange 15 at one end (the upper end in FIGS. 2, 3, 4, and 6) of the leg 14, for holding the airbag attaching member 6 in cooperation with the body panel 2, and the partition plate 21, standing perpendicularly from the flange edge, for partitioning the main airbag unit of the curtain-shield airbag 1 and the main part of the flange 15. In the central portion of the flange 15 and in the axial core of the leg 14 are formed the flange hole 17 and the shaft hole 18 continuing therefrom to allow insertion of the pin 11.

Figure 5:
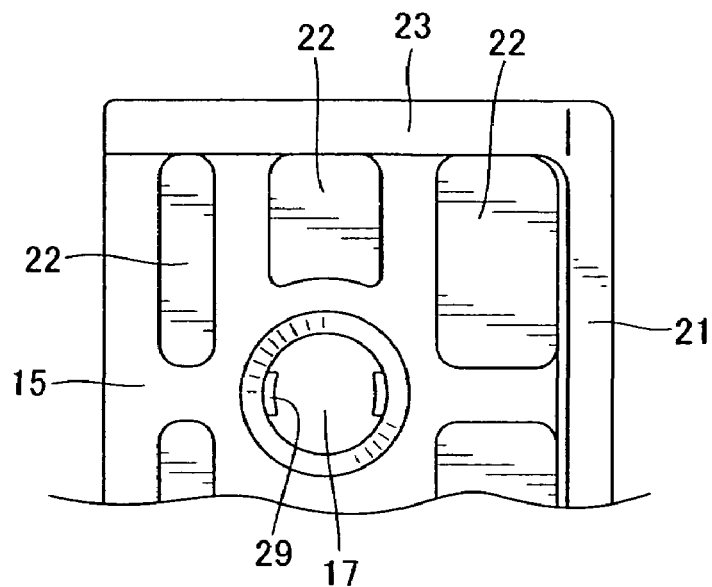
FIG. 5 is a partial plan view of the bushing shown in FIG. 4.
Figure 6:
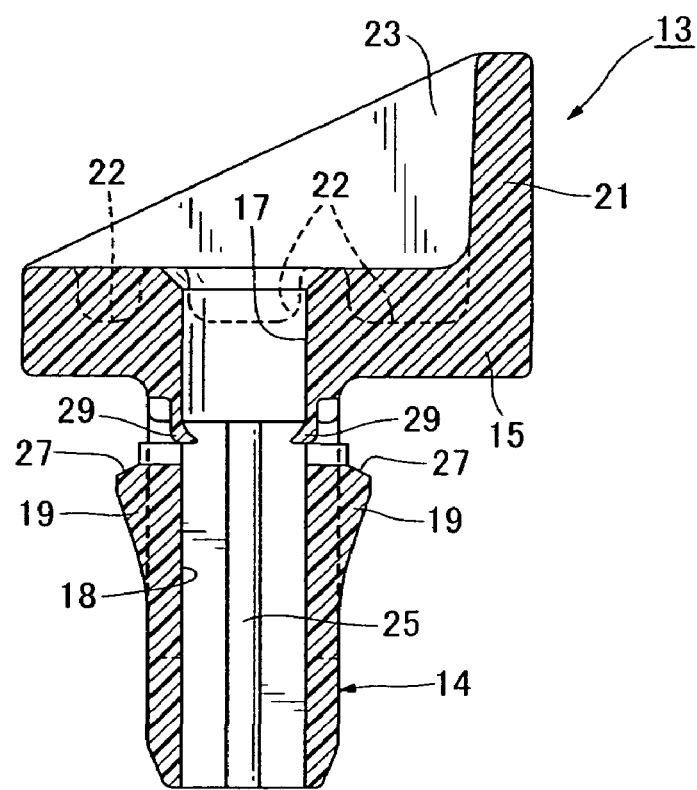
FIG. 6 is a sectional view taken along line 6-6 in FIG. 3.
Figure 7:
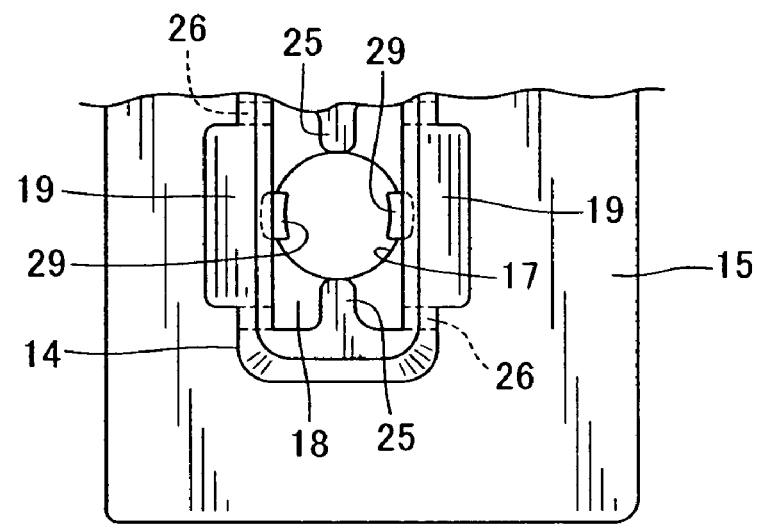
FIG. 7 is a partial underside plan view of the bushing shown in FIG. 4.

The flange 15 is formed so that the surface on the leg 14 side (the lower surface in FIGS. 2, 3, 4, and 6) is flat, so that the entirety thereof can abut the airbag attaching member, and so that the bushing holds the airbag attaching member in cooperation with the body panel. The opening to hole 17 at the opposite side from the leg 14 (the upper surface in FIGS. 2, 3, 4, and 6) is tapered to facilitate reception of a pin. In the example shown, the flange 15 is formed as a substantially rectangular rigid plate-shaped body. A number of concavities 22 can be formed in this body, as shown in FIG. 5, to save on material and reduce the weight of the flange, while maintaining the rigidity thereof.

At one edge of the flange rectangle, the partition plate 21 stands perpendicularly from the flange, in the direction opposite to the direction in which the leg 14 extends, so as to form a partition between the main airbag unit of the curtain-shield airbag 1 and the opening to hole 17 of the flange 15. This partition plate 21 has a certain height and a width that extends across the length of the edge, so as to isolate the main airbag unit from the center part of the flange 15, and has a certain thickness that provides high rigidity. Because of the partition plate 21, when the pin 11 is inserted, there is no extension of the main airbag unit to the center part of the flange 15 where the opening to hole 17 is located, so that any danger of the main airbag unit being drawn in by the pin is eliminated. Also, in the face of the reaction associated with the rapid deployment of the main airbag unit when the curtain-shield airbag is activated, the effects thereof toward the flange 15 can be diminished by the partition plate 21. In the event of such deployment, the force with which the main airbag unit presses against the partition plate 21 is great, so the partition plate 21 is preferably supported by triangular support ribs 23 formed at two other edges of the flange 15 to even more strongly preserve rigidity.

The leg 14 is formed to a suitable length for attaching the airbag attaching member 6 to the body panel 2. The shaft hole 18 of the leg 14 can be formed to any appropriate length so long as the pin 11 can be properly inserted therein. The shaft hole passes completely through the leg 14 in the example shown, but the shaft hole may be terminated at some intermediate point in the leg 14. The cross-sectional shape of the leg 14 may be circular or rectangular or some other shape, but it should preferably be non-circular so that the leg 14 will not turn after attachment has been effected, in order that the partition plate 21 can be set at a position facing the main airbag unit. In the example shown, the leg cross-section is a rectangular shape. Because of the rectangular cross-section of the leg 14, turning can be prevented after leg 14 insertion, and it is easy for a worker, by visual inspection, to attach the bushing 13 to the airbag attaching member so that the partition plate 21 faces the main airbag unit. The cross-section of the shaft hole 18 of the leg 14 can be any appropriate shape that will permit proper insertion of the pin. In this embodiment, the cross-section of the shaft hole 18 is rectangular, which matches the rectangular cross-section of the leg. On the inner wall of the shaft hole 18, a pair of guide ribs 25 (see FIGS. 6, 7) is formed, to a certain thickness, protruding laterally inside, for guiding the pin 11 inserted into the shaft hole in alignment with the axial core of the shaft hole.

Figure 3:
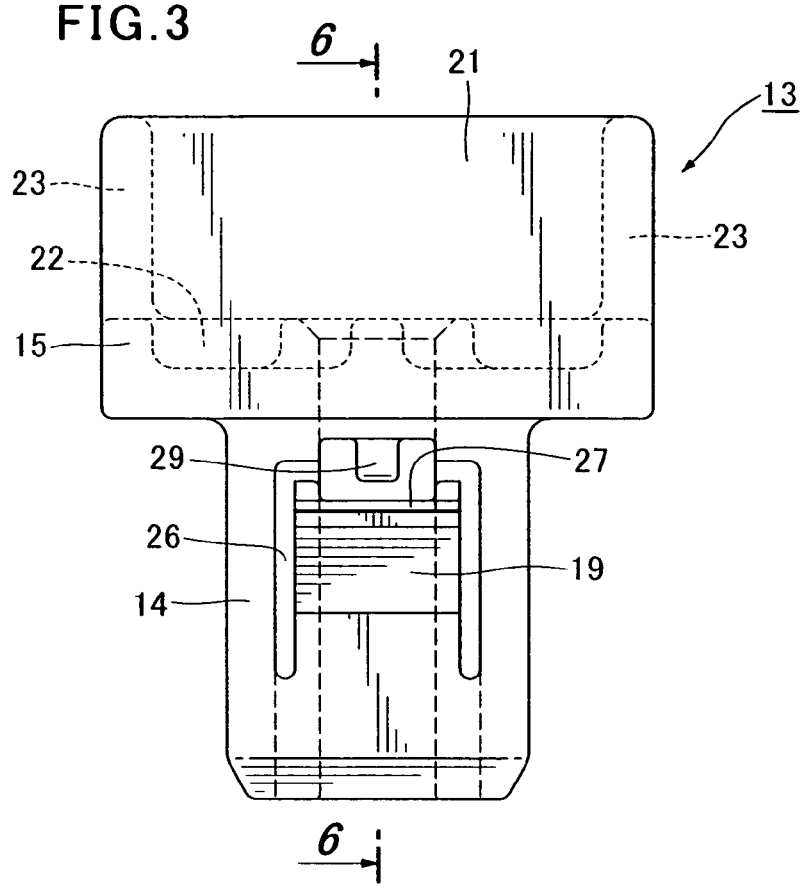
FIG. 3 is a right-side elevation view of the bushing of the clip shown in FIG. 2.
Figure 4:
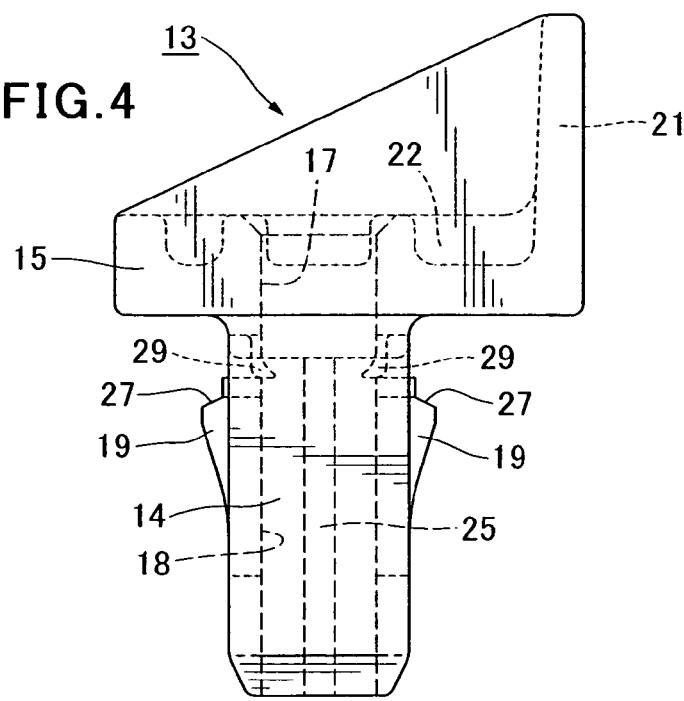
FIG. 4 is a front elevation view of the bushing shown in FIG. 3.

On side surfaces of the leg 14, a pair of resiliently mounted engagement pieces 19 is deployed, protruding laterally to the outside. The engagement pieces can effect provisional fixing at the edges of the two attachment holes, i.e. the one in the airbag attaching member and the one in the body panel. The engagement pieces 19 are configured so that, when the pin 11 is substantially fully inserted into the bore 17, 18, flexure to the inside is prevented, and, when the pin 11 is not so inserted, flexure to the inside is allowed. Each of the engagement pieces 19 is formed with the leg 14 end (lower end in FIGS. 2, 3, 4, and 6) as its root and the flange 15 end as its free end. For that reason, as shown in FIG. 3, an inverted U-shaped slit 26 is formed about the periphery of each engagement piece 19. This slit separates the engagement piece from the main body of the leg 14.

The lower end of the engagement piece 19, where the engagement piece is attached to the leg 14, forms a hinge that imparts elasticity to the engagement piece so that the free end of the engagement piece can move inwardly and outwardly relative to the leg 14. On the outer surface of the engagement piece 19, shoulder 27 is formed for engaging edge regions of the attachment holes of both the airbag attaching member and the body panel. The engagement piece 19 is formed so as to slope gently from the shoulder 27 toward the tip of the leg, so that the engagement piece does not become an impediment when the leg 14 is inserted into the attachment holes of both the airbag attaching member and the body panel. The position of the shoulder 27 is determined suitably to match the thickness of the airbag attaching member and the body panel.

On the inside of the leg 14, one or more pawls 29 are formed, extending elastically inside at positions adjacent to the flange 15. The pawls are useful for coupling the pin 11 to the bushing 13, while maintaining the provisionally fixed condition at which the engagement pieces 19 of the bushing 13 can flex to the inside of the shaft hole 18.

Figure 8:
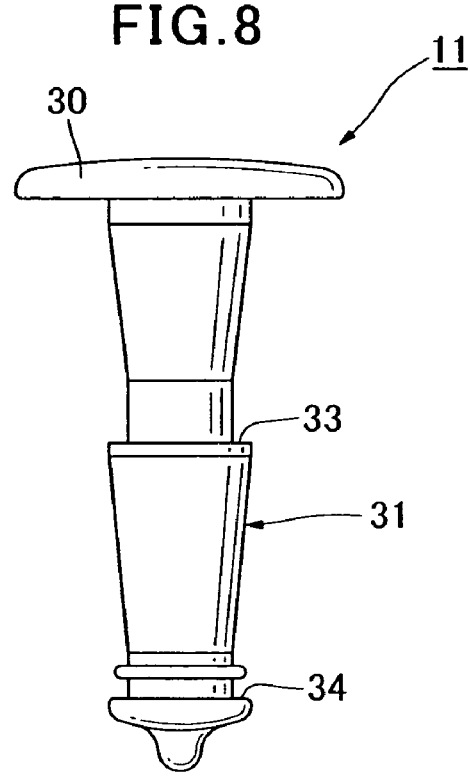
FIG. 8 is a front elevation view of the pin in the clip shown in FIG. 2.

The pin 11 will now be described with reference to FIG. 8 and FIG. 2. The pin 11 is formed overall in a rod shape. A large-diameter head 30 of circular shape, for example, is formed at one end (the upper end in the figures) of a shaft 31 which forms the main body of the pin, and makes such operations as insertion into the bushing 13 easy. To enhance rigidity, the shaft 31 and head 30 of the pin 11 are preferably solid (not hollow). On the shaft 31, a permanently fixing engagement part 33 is formed, at a position of intermediate height, for engaging the pawls 29, so as to maintain the permanently fixed condition when the pin 11 has been fully inserted in the bore 17, 18. On the shaft 31, in addition, a provisionally fixing engagement part 34 is formed. The tip portion (lower end in FIG. 2) of the shaft 31 stops at a position adjacent to the flange 15 of the shaft hole 18, for engaging the pawls 29 with the engagement part 34, so as to maintain the provisionally fixed condition. In FIG. 2, the pin and the bushing are coupled, so that they are not easily separated, by the provisionally fixing engagement part 34 engaging the pawls 29. Thereby, the pin 11 and the bushing 13 can be held together. In this provisionally fixed condition, moreover, the engagement pieces 19 are also in a provisionally fixed condition wherein they can flex to the inside of the shaft hole 18.

Provisional fixing of the clip 10 to the airbag attaching member of the curtain-shield airbag can be accomplished easily by the simple operation of inserting the leg 14 of the bushing 13 into the attachment hole of the airbag attaching member. As shown in FIG. 8, the permanently fixing engagement part 33 is an engagement shoulder formed at a position between the tip (lower end) and the head 30 of the shaft 31, and the provisionally fixing engagement part 34 is an engagement shoulder formed near the tip of the shaft 31. Portions of the pin 11 are tapered, as shown in FIG. 8, to facilitate insertion of the pin into the bore of the bushing 13. The shaft 31, is preferably solid and of high rigidity, so that, in the permanently fixed condition wherein the shaft 31 of the pin 11 has been deeply inserted into the shaft hole 18 of the leg 14 of the bushing 13, the inner walls of the free ends of the engagement pieces 19 (the ends on the flange 15 side) facing the shaft hole are prevented from flexing to the inside. Thus, the clip 10 is attached to the airbag attaching member 6 and the body panel 2 with high strength.

Figure 9:
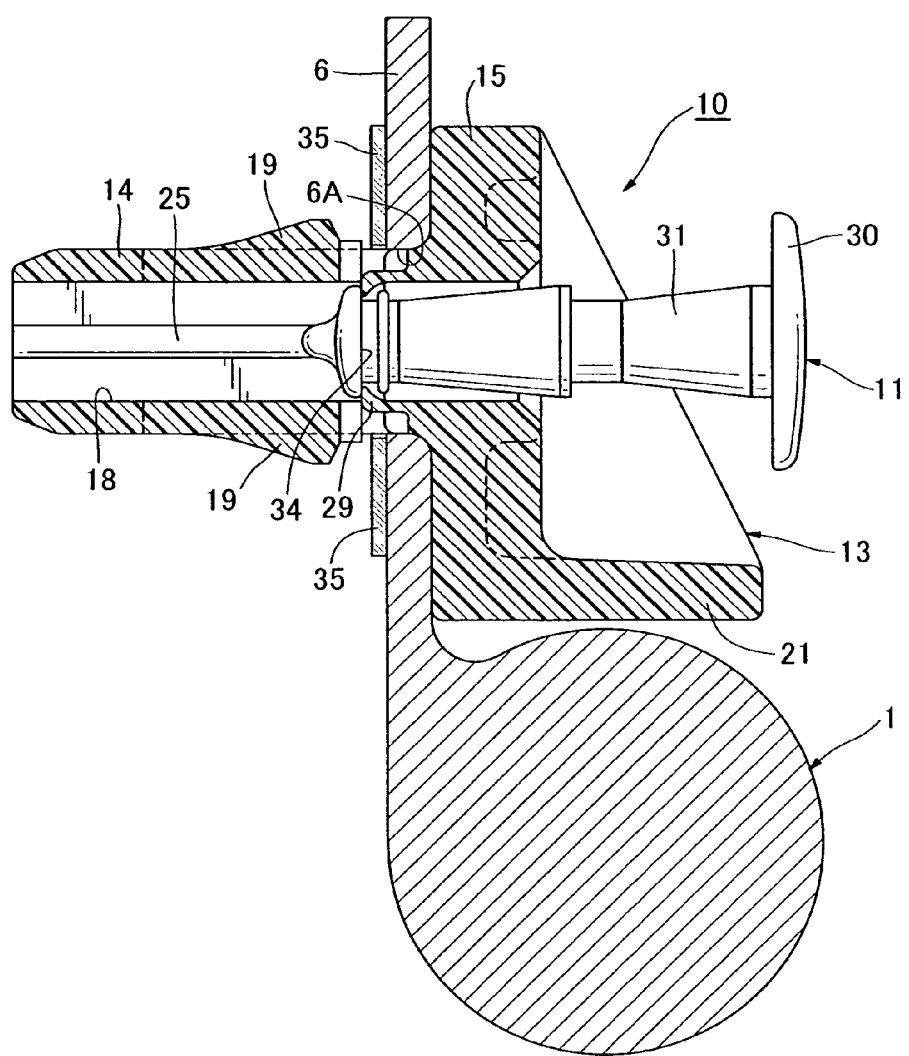
FIG. 9 is a sectional view showing how a clip relating to an embodiment of the present invention is provisionally fixed to in a curtain-shield airbag.

The operation of using the clip 10 having the configuration described above to attach the curtain-shield airbag 1 to the body panel 2 of an automobile will now be described with reference to FIG. 2 and FIGS. 9 to 11. First, as shown in FIG. 2, with the shaft 31 of the pin 11 inserted both in the hole 17 of the flange 15 of the bushing 13 and in the shaft hole 18 of the leg 14, in the provisionally fixed condition wherein the provisionally fixing engagement part 34 is engaged with the pawls 29 at a provisionally fixing position, the pin 11 and the bushing 13 are coupled, so that the clip 10 is in a provisionally fixed coupled condition. Next, as shown in FIG. 9, the leg 14 of the clip 10 in the provisionally fixed coupled condition is inserted into the attachment hole 6A of the airbag attaching member 6 for the curtain-shield airbag 1, whereupon the clip 10 is pre-attached to the curtain-shield airbag 1. When that is the case, the partition plate 21 will be positioned so as to face the main airbag unit of the curtain-shield airbag 1. The partition plate 21 effects a partition between the main airbag unit and the airbag attaching member 6, so that the leg 14 of the bushing 13 can easily be inserted into the attachment hole of the airbag attaching member 6.

Clips 10 can be attached beforehand, respectively, in the attachment holes of a plurality of airbag attaching members 6 (see FIG. 1), thereby forming a clip-equipped curtain-shield airbag assembly. Merely by carrying this curtain-shield airbag assembly onto an automobile outfitting line or the like and inserting legs of the bushings through a body panel, the curtain-shield airbag can be provisionally fixed to the body panel, and the number of operations on the outfitting line can be reduced. Furthermore, when the legs 14 are inserted into the attachment holes of the airbag attaching members 6, or after that insertion, a support plate 35 for holding the airbag attaching members 6 in cooperation with the flanges 15 can be attached by inserting the legs 14 through attachment holes in the support plate. The support plate 35, as shown, is formed of thin plate material, and the attachment holes through which the legs 14 pass are formed of such size as to engage the shoulders of the engagement pieces 19 with edge regions of the attachment holes, so that a provisionally fixed condition wherein the airbag attaching members 6 are flush against the flanges 15 is maintained. By selecting the thickness of the support plate 35, the total thickness of the attachment regions when the curtain-shield airbag 1 is attached to the body panel 2 can also be suitably adjusted.

Figure 10:
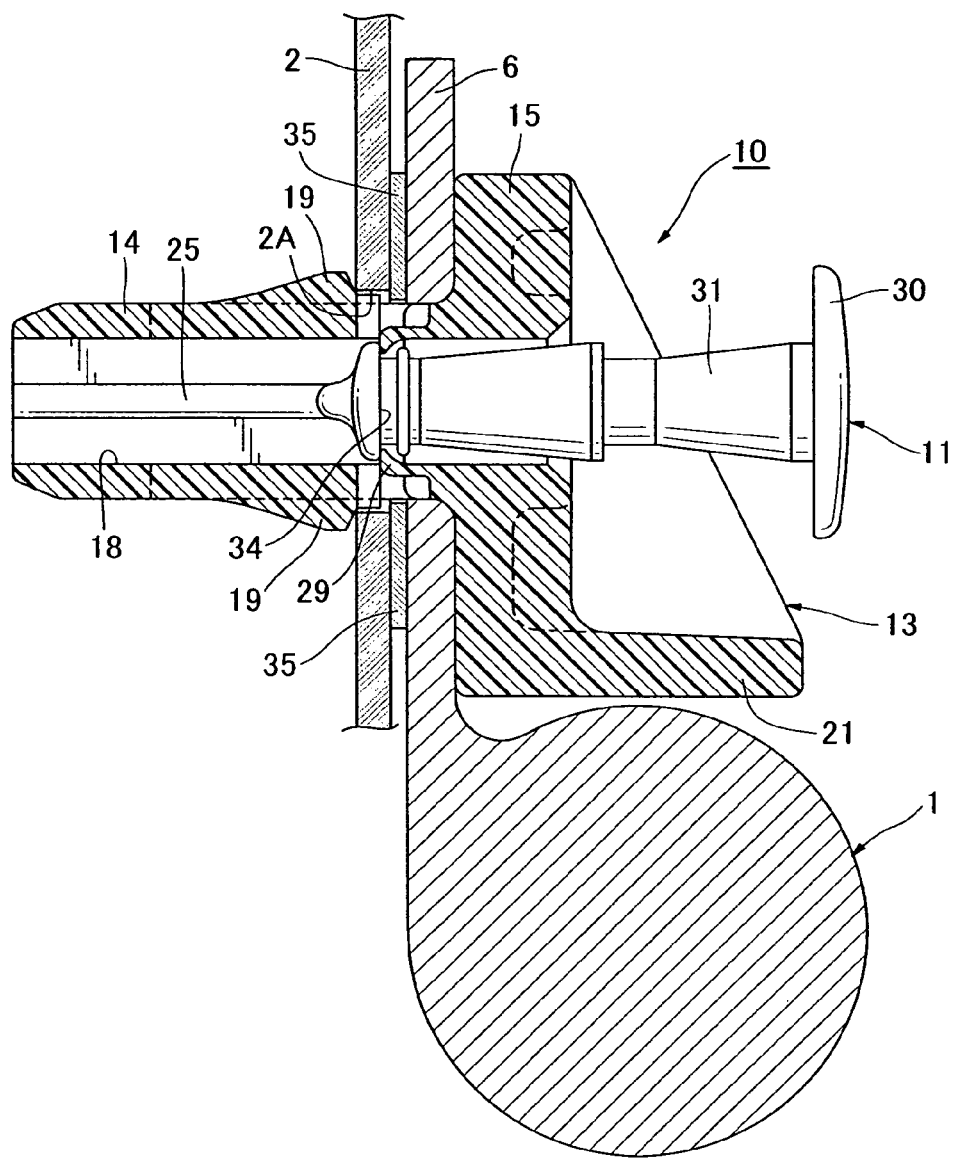
FIG. 10 is a sectional view showing how the clip-equipped curtain-shield airbag shown in FIG. 9 is provisionally fixed to a body panel.

In FIG. 10, the airbag attaching member 6 of the clip-equipped curtain-shield airbag 1 is coupled in a provisionally fixed condition to the body panel 2, thereby forming an assembly that includes the body panel. For this coupling, each attachment hole 2A is formed at a prescribed position (position of the airbag attaching members 6 in FIG. 1) in the body panel 2. Thereupon, the tip of the leg 14 of each bushing 13 on the curtain-shield airbag 1 to which the clip 10 is pre-attached is aligned with an attachment hole 2A. Next, merely by inserting the legs 14 into the attachment holes 2A, the engagement pieces 19 will engage edge regions of the attachment holes 2A in the body panel 2, and the airbag 1 will be attached to the body panel 2 through the clip 10. This condition is the provisionally fixed condition. By having a plurality of clips 10 attached, respectively, at prescribed positions on the curtain-shield airbag 1, and merely inserting the legs 14 into attachment holes 2A formed at corresponding positions (positions of the airbag attaching members 6 in FIG. 1) of the body panel 2, the curtain-shield airbag 1 will be provisionally fixed at a prescribed position on the body panel 2.

Figure 11:
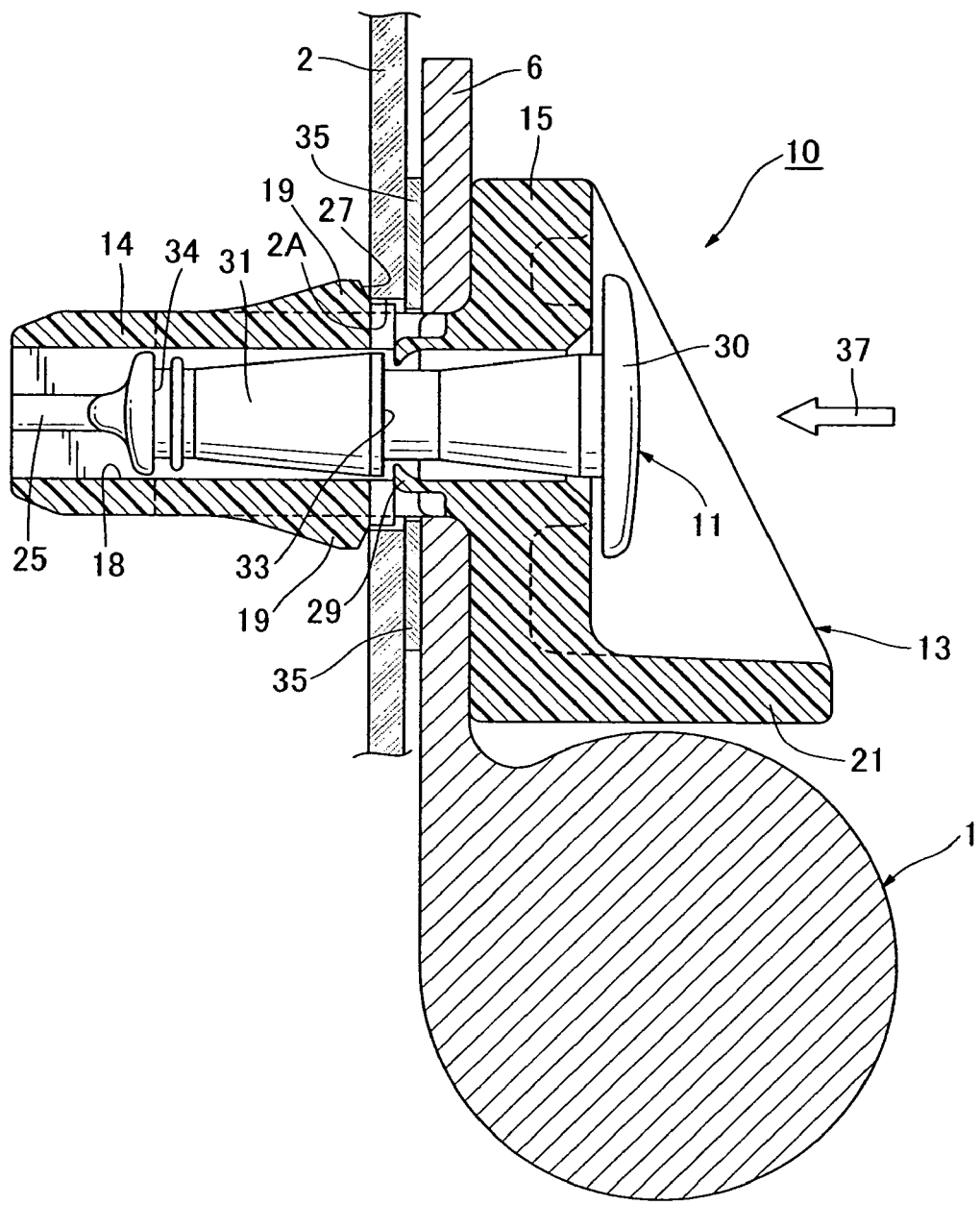
FIG. 11 is a sectional view showing how, from a provisionally fixed condition, a curtain-shield airbag is permanently fixed to a body panel by the insertion of a pin.

In FIG. 11, the head 30 of a provisionally fixed pin 11 is inserted by hand, in the direction of arrow 37, into the bushing 13 of each clip 10, and the shaft 31 of the pin 11 is inserted deeply into the shaft hole of the leg 14. The tapered configuration of the shaft 31 facilitates insertion of the pin. At an edge of the flange 15, the partition plate 21 effects a partition between the main airbag unit and the center of the flange 15, so that there is no danger of the main body of the airbag 1 being caught and tightened down when the pin 11 is inserted. The shaft 31 of the pin 11, due to the strong pressing force toward the head 30, is inserted deeply into the shaft hole 18, with the provisionally fixing engagement part 34 passing the pawls 29, and, when the head 30 of the pin 11 is substantially flush against the flange 15, the pawls 29 engage the permanently fixing engagement part 33 of the shaft 31 at a permanently fixing position, whereupon a permanent fixing condition is effected. Because the shaft 31 is on the inside of the engagement pieces 19, the condition of the engagement pieces 19 is such that they protrude to the outside, with the flexure thereof to the inside prevented; the engagement shoulders 27 are engaged with the body panel 2; and the permanent fixing condition is maintained. Accordingly, the curtain-shield airbag 1 is very strongly attached to the body panel 2. Also, the partition plate 21 can cope with the shock of the reaction accompanying the rapid deployment of the airbag when it is activated, and the effects thereof toward the flange 15 side can be diminished.

While preferred embodiments of the invention have been shown and described, it will be apparent that changes can be made without departing from the principles and spirit of the invention, the scope of which is defined in the following claims.

What is claimed is:

1. A clip for attaching an attaching member for a curtain-shield airbag to a body panel, comprising:
    a pin, and a bushing for receiving the pin, wherein:
        the bushing has a leg that is to be inserted into an attachment hole in the airbag attaching member and into an attachment hole in the body panel, and a flange integral with the leg for holding the airbag attaching member in cooperation with the body panel;
        the bushing has a bore through the flange and the leg into which the pin can be inserted;
        the leg has an external flexibly supported engagement piece capable of engaging edge regions of the hole in the airbag attaching member and the hole in the body panel;
        the engagement piece is configured so as to be in a permanently fixed condition with flexure thereof toward the inside of the bore prevented when the pin is inserted into the bore to a permanently fixing position, and so as to be in a provisionally fixed condition, with flexure toward the inside of the bore permitted, when the pin is not inserted into the bore to the permanently fixing position; and
        a partition plate is integrally formed at a flange edge, so as to stand upright from the flange edge to form a partition between the main airbag unit of the curtain-shield airbag and part of the flange at which there is an opening to the bore.

2. The clip recited in claim 1, wherein a pawl extends elastically to the inside of the bore at a position adjacent to the flange, the pin has a permanently fixing engagement part for engaging the pawl so as to maintain the permanently fixed condition when the pin is inserted deeply into the bore, and the pin has a provisionally fixing engagement part for engaging the pawl so as to maintain the provisionally fixed condition when the pin is not inserted deeply into the bore.

3. The clip recited in claim 2, wherein the pin comprises a shaft and a head integrally formed at one end of the shaft, the permanently fixing engagement part is a shoulder formed at a position between a tip of the shaft and the head, and the provisionally fixing engagement part is a shoulder formed near the tip of the shaft.

4. The clip recited in claim 2, wherein when the leg is inserted into an attachment hole in the airbag attaching member of the curtain-shield airbag, in a condition such that the pin and the bushing are coupled by the engagement of the provisionally fixing engagement part and the pawl, the entire clip is pre-attached to the curtain-shield air bag.

5. The clip recited in claim 1, wherein there are a pair of the engagement pieces with one end attached flexibly to the leg and another end free, and the pin shaft inserted deeply into the bore has the rigidity to prevent flexure of the free end of the engagement pieces toward the inside of the bore.

6. A clip for attaching an attaching member for a curtain-shield airbag to a body panel, comprising:
    a bushing having a flange and a leg extending from the flange at one side thereof, the bushing having a bore extending through the flange and into the leg from an opening at an opposite side of the flange, the leg having an opening in a side wall thereof and having a protrusion from the side wall, flexibly mounted on the side wall at a root end of the protrusion remote from the flange, for movement into and out of the bore through the opening in the side wall, the protrusion tapering outwardly of the side wall from the root end to an opposite free end of the protrusion and having a shoulder at the free end for engaging an edge region of a hole in a panel through which the leg is inserted; and
    a pin constructed so that it can be pushed axially into the bore of the bushing to a permanently fixed position at which the pin is held in the bore and blocks movement of the protrusion into the bore.

7. A clip according to claim 6, wherein the bushing and the pin have cooperable elements for holding the pin in the bushing at a provisionally fixed position at which the pin does not block movement of the protrusion into the bore.

8. A clip according to claim 7, wherein the cooperable elements include a provisionally fixing shoulder on the pin and a pawl in the bore.

9. A clip according to claim 8, wherein the pin has a permanently fixing shoulder cooperable with the pawl for holding the pin at the permanently fixed position.

10. A clip according to claim 9, wherein the pin has an outer surface portion that tapers from an end adjacent to the permanently fixing shoulder to a smaller end adjacent to the provisionally fixing shoulder.

11. A clip according to claim 6, wherein the bushing has a partition projecting from an end of the flange in a direction opposite to a direction in which the leg extends from the flange.

12. A bushing for use with a push pin in attaching an attaching member for a curtain-shield airbag to a body panel, wherein the bushing comprises:
a flange with a leg extending from the flange at one side thereof and with a partition plate extending upright from an edge of the flange at an opposite side, the bushing having a bore extending through the flange and into the leg from an opening at the opposite side of the flange, the leg having an opening in a side wall thereof and having a protrusion from the side wall, flexibly mounted on the side wall at a root end of the protrusion remote from the flange, for movement into and out of the bore through the opening in the side wall, the protrusion tapering outwardly of the side wall from the root end to an opposite free end of the protrusion and having a shoulder at the free end for engaging an edge region of a hole in a panel through which the leg is inserted, and the bushing having at least one pawl depending from the flange into the bore for engagement with cooperable elements of the push pin for holding the push pin at predetermined positions in the bore.

13. An assembly comprising a clip and an attaching member for a curtain-shield airbag, wherein the clip comprises:
a bushing having a flange and a leg extending from the flange at one side thereof, the bushing having a bore extending through the flange and into the leg from an opening at an opposite side of the flange, the leg having an opening in a side wall thereof and having a protrusion from the side wall, flexibly mounted on the side wall at a root end of the protrusion remote from the flange, for movement into and out of the bore through the opening in the side wall, the protrusion tapering outwardly of the side wall from the root end to an opposite free end of the protrusion and having a shoulder at the free end for engaging an edge region of a hole in a body panel through which the leg is inserted; and
a pin constructed so that it can be pushed axially into the bore of the bushing to a permanently fixed position at which the pin is held in the bore and blocks movement of the protrusion into the bore,
wherein the flange of the bushing abuts the attaching member and has a partition between a main airbag unit of the curtain-shield airbag and the opening to the bore,
wherein the leg of the bushing extends through a hole in the attaching member, the shoulder of the protrusion is adjacent to an edge region of the hole, and the pin is inserted into the bore of the bushing to a provisionally fixed position at which the pin does not block movement of the protrusion into the bore.

14. An assembly according to claim 13, wherein the bushing and the pin have cooperable elements for holding the pin in the bushing at the provisionally fixed position.

15. An assembly according to claim 14, wherein the cooperable elements include a provisionally fixing shoulder on the pin and a pawl in the bore.

16. An assembly according to claim 15, wherein the pin has a permanently fixing shoulder cooperable with the pawl for holding the pin at the permanently fixed position.

17. An assembly according to claim 16, wherein the pin has an outer surface portion that tapers from an end adjacent to the permanently fixing shoulder to a smaller end adjacent to the provisionally fixing shoulder.

18. An assembly according to claim 13, further comprising a body panel having a hole through which the leg of the bushing is inserted after insertion into the hole of the attaching member, wherein the shoulder of the protrusion engages an edge region of the hole in the body panel.

19. An assembly comprising a clip, an attaching member for a curtain-shield airbag, and a body panel, wherein the clip comprises:
a bushing having a flange and a leg extending from the flange at one side thereof, the bushing having a bore extending through the flange and into the leg from an opening at an opposite side of the flange, the leg having an opening in a side wall thereof and having a protrusion from the side wall, flexibly mounted on the side wall at a root end of the protrusion remote from the flange, for movement into and Out of the bore through the opening in the side wall, the protrusion tapering outwardly of the side wall from the root end to an opposite free end of the protrusion and having a shoulder at the free end for engaging an edge region of a hole in the body panel through which the leg is inserted; and
a pin constructed so that it can be pushed axially into the bore of the bushing to a permanently fixed position at which the pin is held in the bore and blocks movement of the protrusion into the bore,
wherein the flange of the bushing abuts the attaching member and has a partition between a main airbag unit of the curtain-shield airbag and the opening to the bore,
wherein the leg of the bushing extends through a hole in the attaching member and then through the hole in the body panel, wherein the shoulder of the protrusion engages an edge region of the hole in the body panel, and the pin is inserted in the bore of the bushing to the permanently fixed position.

20. An assembly according to claim 19, wherein the bushing and the pin have cooperable elements for holding the pin in the bushing at the provisionally fixed position.

21. An assembly according to claim 20, wherein the cooperable elements include a provisionally fixing shoulder on the pin and a pawl in the bore.

22. An assembly according to claim 21, wherein the pin has a permanently fixing shoulder cooperable with the pawl for holding the pin at the permanently fixed position.

23. An assembly according to claim 22, wherein the pin has an outer surface portion that tapers from an end adjacent to the permanently fixing shoulder to a smaller end adjacent to the provisionally fixing shoulder.

* * * * *